US010180797B2

(12) United States Patent
Grimsrud (10) Patent No.: US 10,180,797 B2
(45) Date of Patent: *Jan. 15, 2019

(54) DETERMINING ADJUSTMENTS TO THE SPARE SPACE IN A STORAGE DEVICE UNAVAILABLE TO A USER BASED ON A CURRENT CONSUMPTION PROFILE OF A STORAGE DEVICE

(71) Applicant: INTEL CORPORATION, Santa Clara, CA (US)

(72) Inventor: Knut S. Grimsrud, Forest Grove, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/610,615

(22) Filed: May 31, 2017

(65) Prior Publication Data

US 2017/0322739 A1 Nov. 9, 2017

Related U.S. Application Data

(63) Continuation of application No. 14/565,352, filed on Dec. 9, 2014, now Pat. No. 9,678,677.

(51) Int. Cl.
*G06F 12/00* (2006.01)
*G06F 3/06* (2006.01)
*G06F 12/02* (2006.01)

(52) U.S. Cl.
CPC ............ *G06F 3/0616* (2013.01); *G06F 3/064* (2013.01); *G06F 3/0679* (2013.01);
(Continued)

(58) Field of Classification Search
CPC .................................................. G06F 12/0246
(Continued)

(56) References Cited

U.S. PATENT DOCUMENTS 8,479,080 B1 * 7/2013 Shalvi .................... G06F 11/10
365/185.09
8,712,751 B2 4/2014 Chen
(Continued)

FOREIGN PATENT DOCUMENTS

TW 201106186 2/2011
WO 2009070196 6/2009

OTHER PUBLICATIONS

Hoffman, C., "Why Solid-State Drives Slow Down As You Fill Them Up", How-To-Geek, [online], Jun. 21, 2013, [Retrieved on Nov. 16, 2014], retrieved from the Internet at <URL: http://www.howtogeek.com/165542/why-solid-state-drives-slow-down-as-you-fill-them-up/>, 4 pp.

(Continued)

*Primary Examiner* — Tuan Thai
*Assistant Examiner* — Tasnima Matin
(74) *Attorney, Agent, or Firm* — Konrad Raynes Davda & Victor LLP; David W. Victor (57) ABSTRACT

Provided are a computer program product, system and method for determining adjustments to the spare space in a storage device unavailable to a user based on a current consumption profile of a storage device. A current write amplification is based on storage writes to a media at a storage device and host writes from a host to the storage device. An adjustment to the current write amplification is determined to produce an adjusted write amplification based on an estimated lifespan of the storage device, a maximum storage writes for the storage device, and the storage writes at the storage device since the storage device was powered-on. A determination is made to an adjustment to spare space based on the adjusted write amplification. The spare space and the free space available to the user are reconfigured to adjust the spare space by the determined adjustment to the spare space.

29 Claims, 6 Drawing Sheets

(52) U.S. Cl.
CPC .. *G06F 12/0246* (2013.01); *G06F 2212/1044* (2013.01); *G06F 2212/7205* (2013.01)

(58) Field of Classification Search
USPC .................................................. 711/103, 115
See application file for complete search history.

(56) References Cited

U.S. PATENT DOCUMENTS

| | | | |
|---|---|---|---|
| 8,799,561 | B2 | 8/2014 | Bux et al. |
| 9,678,677 | B2 | 6/2017 | Grimsrud |
| 2005/0038971 | A1 | 2/2005 | Tsukamoto |
| 2005/0235128 | A1 | 10/2005 | Rustagi et al. |
| 2009/0300277 | A1 | 12/2009 | Jeddeloh |
| 2010/0174851 | A1 | 7/2010 | Leibowitz et al. |
| 2010/0262765 | A1 | 10/2010 | Cheon et al. |
| 2011/0099320 | A1 | 4/2011 | Lucas et al. |
| 2012/0221784 | A1 | 8/2012 | Ban |
| 2012/0303873 | A1 | 11/2012 | Nguyen et al. |
| 2013/0007380 | A1 | 1/2013 | Seekins et al. |
| 2013/0124945 | A1 | 5/2013 | Hu et al. |
| 2013/0185487 | A1 | 7/2013 | Kim et al. |
| 2013/0191601 | A1 | 7/2013 | Peterson et al. |
| 2014/0068153 | A1 | 3/2014 | Gu et al. |
| 2014/0181370 | A1* | 6/2014 | Cohen ............... G06F 12/0246 711/103 |
| 2014/0359198 | A1 | 12/2014 | Zaltsman et al. |
| 2016/0162205 | A1 | 6/2016 | Grimsrud |

OTHER PUBLICATIONS

Hu, X., et al., "Write Amplification Analysis in Flash-Based Solid State Drives", Proceedings of SYSTOR 2009: The Israeli Experimental Systems Conference, 2009, 9 pp.

Kumar, S. et al., "Solid State Drive (SSD) FAQ", Dell, Oct. 2011, 12 pp.

Luojie, X., et al., "An Improved Analytic Expression for Write Amplification in NAND Flash", IEEE 2012, 5 pp.

Samsung, "Understanding SSDs: A Peek Behind the Curtain", [online], © 2014, [Retrieved on Nov. 15, 2014], Retrieved from the Internet at <URL: http://www.samsung.com/global/business/semiconductor/minisite/SSD/us/html/about/whitepaper04.html., 3 pp.

Shimpi, A. L., "Exploring the Relationship Between Spare Area and Performance Consistency in Moder SSDs", AnandTech, [Online], Dec. 4, 2012, [Retrieved on Nov. 16, 2014], Retrieved from the Internet at <URL: http://www.anandtech.com/print/6489/playing-with-op>, 8 pp.

Wikipedia, "Write Amplification", [online], Last Modified Oct. 31, 2014, [Retrieved on Nov. 15, 2014], retrieved from the Internet at <URL: http://en.wikipedia.org/w/index.php?title=Write_amplification&oldid=631854858>, 13 pp.

Office Action 1 for U.S. Appl. No. 14/565,352, dated Sep. 13, 2016, 38 pp.

Response to Office Action 1 for U.S. Appl. No. 14/565,352, dated Dec. 13, 2016, 15 pp.

Notice of Allowance 1 for U.S. Appl. No. 14/565,352, dated Jan. 19, 2017, 13 pp.

International Search Report and Written Opinion for International Application No. PCT/US2015/059793, dated Apr. 20, 2016, 10 pp.

International Preliminary Report on Patentability for International Application No. PCT/US2015/059793, dated Jun. 22, 2017, 7 pp.

Office Action 1 for TW Application No. 104133710, dated Aug. 18, 2016, 18 pp. (W/ Engl. Translation of Claims).

U.S. Pat. No. 8,712,751, dated Apr. 29, 2014, is an English language equivalent of TW Publication No. 201106186, dated Feb. 16, 2011.

European Search Report for EP Application No. 15866704.8, dated Jun. 22, 2018, 10 pp.

* cited by examiner

FIG. 1

Consumption Profile Information

FIG. 2

Write Amplification Function

DETERMINING ADJUSTMENTS TO THE SPARE SPACE IN A STORAGE DEVICE UNAVAILABLE TO A USER BASED ON A CURRENT CONSUMPTION PROFILE OF A STORAGE DEVICE

TECHNICAL FIELD

Embodiments described herein generally relate to determining adjustments to the spare space in a storage device unavailable to a user based on current consumption profile of a storage device.

BACKGROUND

Solid state drives (SSDs) experience a phenomena where one host write to the device results in multiple writes to non-volatile memory in the SSD. This occurs because with non-volatile memory, such as NANDs, a block of pages must be erased before data can be written into one of the pages in the block, which requires rewriting some of the pages in the block. Write amplification is measured by the ratio of writes committed to the non-volatile memory to the writes coming from the host system.

In SSD devices, when the pages in a block of non-volatile memory have both valid data and stale data (invalid or data not needed), a garbage collection process reads the pages having valid data and rewrite the valid data into an erased empty block to consolidate pages having valid data into fewer blocks to have more free blocks available for write operations. After the garbage collection, the blocks from which valid data was written are then free and available for further write data or garbage collection.

The garbage collection process increases write amplification, and reduces system performance, because a host write may require a whole block to be reclaimed, having valid and stale data, and all the valid data being relocated before the black can be freed for the new host write. To reduce the impact of write amplification, SSDs use over-provisioning of the non-volatile memory by leaving blocks of storage space as spare space available to garbage collection operations, where the spare space is not available to the user. The over-provisioned spare space helps lower write amplification by using the blocks in the spare space for garbage collection to free up blocks to be available for write operations. The amount of spare space impacts the efficiency of the garbage collection by impacting the expected amount of valid and stale data in the block being recycled. For instance, a drive that has greater spare capacity will have more invalid data in a block it selects for garbage collection, since the spare space corresponds to how much total invalid blocks there are in the blocks being garbage collected. Garbage collection ensures that there are always free space blocks available for the write operation so that garbage collection does not need to be used during the write operation to make space available for a write of new data to the non-volatile memory. Manufacturers may configure spare space in the non-volatile memory in the SSD that is unavailable for the user and used for garbage collection, wear leveling and other management operations.

Further, the write amplification varies with the workload and certain workloads, such as sequential writes, generally experience lower write amplification than other workloads, such as random writes. Further, if a particular host has a lower than expected host write activity level, then there may be less wear on the NAND than expected.

BRIEF DESCRIPTION OF THE DRAWINGS

Embodiments are described by way of example, with reference to the accompanying drawings, which are not drawn to scale, in which like reference numerals refer to similar elements.

DESCRIPTION OF EMBODIMENTS

Manufacturers must balance the need to provide spare space to lower write amplification and reduce the number of writes to extend the life of the SSD and flash memory with the need to provide as much space as possible to the user. There is a need in the art for improved techniques to optimally manage the spare space in the storage device.

In a SSD, the wear on non-volatile memory such as NAND, which has limited number of write cycles, is a function of the rate of host writes multiplied by write amplification and the write amplification is a function of the amount of spare capacity space hidden from the user. Spare capacity reduces the effect of write amplification and thus the wear on the SSD. However, this need to reduce write amplification and write wear must be balanced with the user interest in maximizing available capacity because spare space is unavailable to the user.

Described embodiments seek to optimize the balance of spare space and user available space in a non-volatile memory by providing a technique to determine whether adjustments should be made to either decrease or increase the spare space based on the current wear trajectory of the drive. The wear trajectory is based on a SSD consumption profile, including current host write levels during the life of the SSD, the current powered-on time of the SSD, the estimated lifespan of the SSD, and the maximum number of drive writes rated for the SSD. Described embodiments provide techniques to determine an adjustment to decrease the spare space and increase the user available space if the current write trajectory level is sufficiently low such that at the historical host write rate to the drive, the write amplification could be increased and still reach the estimated lifespan of the drive within the maximum writes rated for the drive.

Further, described embodiments provide techniques to determine an adjustment to increase the spare space and decrease the user available space if the current host write trajectory level is sufficiently high such that at the historical host write rate to the drive, the write amplification needs to be reduced in order for the storage drive to reach the estimated lifespan of the drive without exceeding the maximum drive writes rated for the drive. Increasing the spare space to lower the write amplification thus extends the lifespan of the drive when the current wear level is sufficiently high such that the drive will have a shorter lifespan than estimated at the current wear rate if the spare space is not increased.

Described embodiments determine the appropriate level of adjustment to the spare space by using the drive consumption profile maintained in the storage device to determine an adjustment to the write amplification and then using a write amplification function to determine the corresponding adjustment that can be made to the spare space as a result of the adjustment to the write amplification.

Further embodiments provide techniques to determine an appropriate adjustment to the spare space as needed to increase the user available space. This adjustment information may then be presented to the user of the storage device at a host system to decide whether to make the adjustment as determined by the storage device itself or a storage device driver running in the host system.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage devices electronic assemblies. Embodiments include both devices and methods for forming electronic assemblies.

Figure 1:
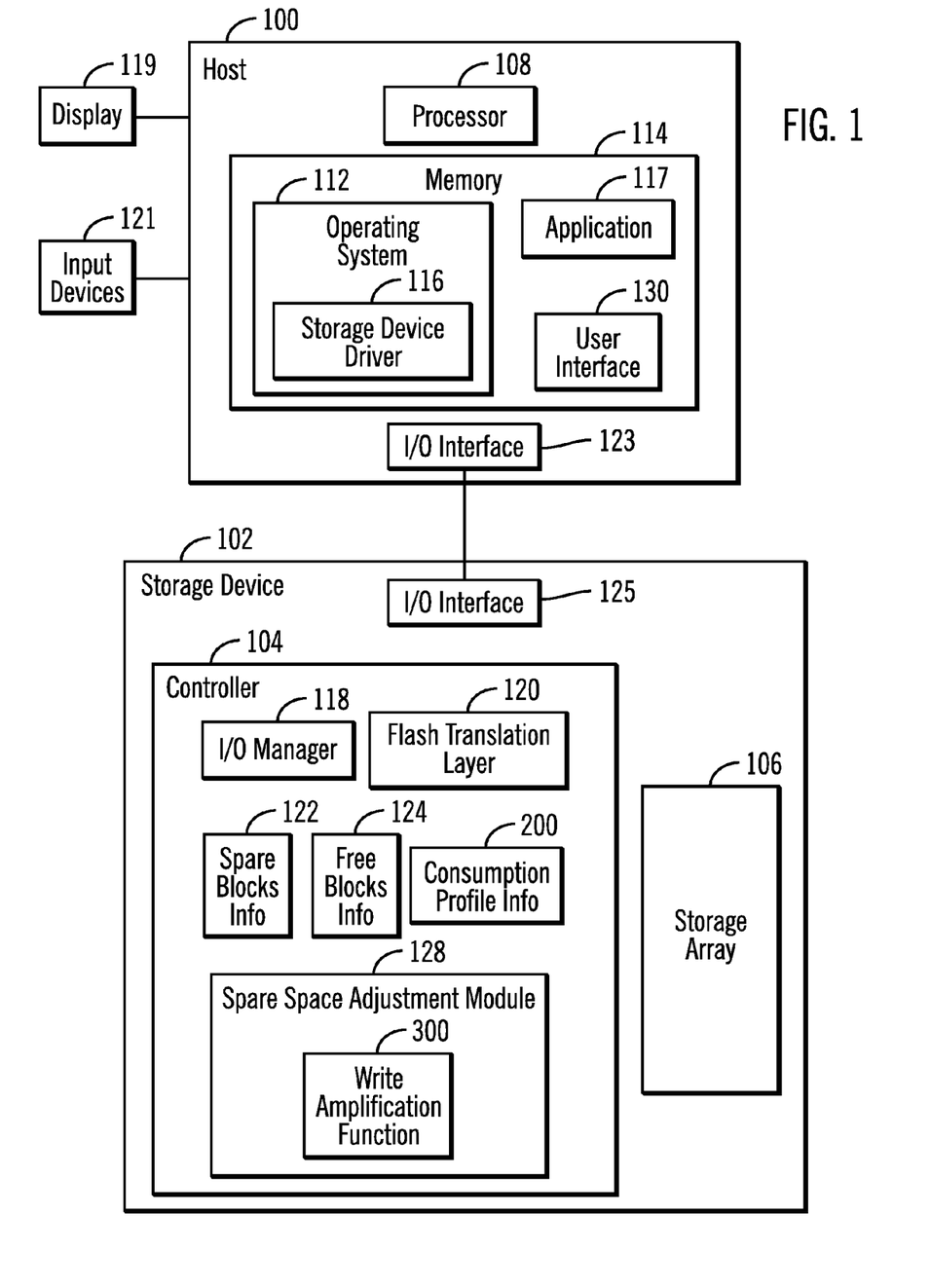
FIG. 1 illustrates an embodiment of a host system and storage device in a computing environment.

FIG. 1 illustrates an embodiment of a host system 100 in communication with a storage device 102. The storage device 102 includes a non-volatile memory controller 104 to perform read, write and failure recovery operations with respect to a non-volatile memory storage array 106. The host 100 may send host read and write requests to the storage device 102 to read and write data with respect to the non-volatile memory storage array 106.

The storage device 102 may comprise a flash device, an SPI flash device, a solid state storage drive (SSD), a flash controller and flash device (e.g., NAND or NOR), and other read/write storage type devices, such as a memory device, disk drive, etc. The storage device 102 may comprise any storage device that would benefit by optimally managing write amplification.

The storage array 106 may comprise electrically erasable and non-volatile memory cells, such as flash storage devices. For instance, the memory storage array 104 may comprise NAND dies of memory cells. In one embodiment, the NAND dies may comprise a multilevel cell (MLC) NAND flash memory that in each cell records two bit values, a lower bit value and an upper bit value. Alternatively, the NAND dies may comprise single level cell (SLC) memories. The storage array 106 may also comprise, but is not limited to, MLC NAND flash memory, ferroelectric random-access memory (FeTRAM), nanowire-based non-volatile memory, three-dimensional (3D) crosspoint memory such as phase change memory (PCM), memory that incorporates memristor technology, Magnetoresistive random-access memory (MRAM), Spin Transfer Torque (STT)-MRAM, a single level cell (SLC) Flash memory and other electrically erasable programmable read only memory (EEPROM) type devices. The described embodiments may be used with any class of memories that require garbage collection and that experience write amplification as an effect of the garbage collection.

The host 100 includes a processor 108 and a memory 110 having program code executed by the processor 108, including an operating system 112 having a storage device driver 116 to interface the operating system 112 with the storage device 102, one or more applications 117, a display 119, such as a computer monitor, input devices 121, such as a keyboard, mouse, touchscreen, etc., and a host Input/Output (I/O) interface 123 to interface and communicate with a corresponding device I/O interface 125 in the storage device 102. The host 100 may comprise a server, workstation, desktop computer, virtual machine, laptop, tablet, smartphone, and other computing devices known in the art. The storage device 102 may be within the host 100 enclosure as an internal storage deice 102 or an external storage device 102.

In some embodiments, the host 123 and device 125 I/O interfaces are a Serial Advanced Technology Attachment (SATA) interface and include a SATA compliant bus coupling the host 100 and the storage device 102. In other embodiments, other types of I/O interfaces and bus interconnects may be used, such as Serial Attached Small Computer System Interface (SCSI) (or simply SAS), Peripheral Component Interconnect Express (PCIe), etc.

The controller 104 includes a an Input/output (I/O) manager 118 to manage read and write requests from the host 100, a flash translation layer 120 to translate logical addresses used by the host operating system 112 to physical locations in the storage array 106; spare block information 122 indicating spare blocks of pages that comprise overprovisioned storage unavailable to the user and for use in garbage collection to consolidate pages in blocks in the user space; free block information 124 indicating blocks of pages that do not have storage and are available to the user; and consumption profile information of the storage device 102. The controller 104 may further include a spare space adjustment module 128 to adjust the spare space or amount of blocks provisioned in the spare space list 124 depending on write activity (i.e., wear level) in the storage device 102. The spare space adjustment module 128 includes a write amplification function 300 that indicates an amount of spare space that should be provisioned for different measured write amplifications.

Spare space, also known as reserve capacity, comprises space hidden from the user but available to the controller 104 for garbage collection and other management operations. User space, also known as user capacity, comprises memory space available to the user of the host system 100 through the storage device driver 116 and host operating system 112.

In FIG. 1, the spare space adjustment module 128 is shown included in the storage device 102. In a further embodiment, the spare space adjustment module 128 may be alternatively or additionally included in the storage device driver 116 and executed in the host system 100.

Figure 2:
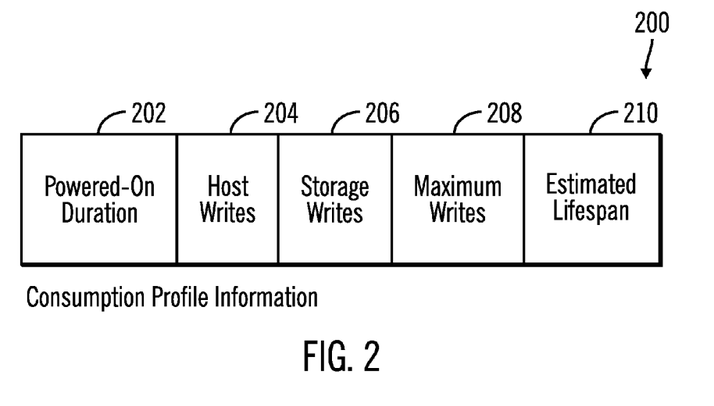
FIG. 2 illustrates an embodiment of storage device metadata gathered in the storage device.

FIG. 2 illustrates an embodiment of the consumption profile information 200 as including a power-on duration 202 indicating an amount of time, in hours, days, minutes, etc., that the storage device 102 has been in the power-on state; host writes 204 indicating an amount of data sent by the host to write, such as in gigabytes (GB), or a number of writes by the host 100; storage writes 206 indicating an amount of data written or number of write cycles for data written to the storage array 106 in the storage device 102, such as the NAND cells; a maximum storage writes 208, such as in bytes or number of storage writes that can be written to the storage array 106 over its lifetime; and an estimated lifespan 200 indicating an estimated duration of the storage device 102, such as a warrantied or advertised lifetime. The consumption profile information 200 may comprise S.M.A.R.T. (Self-Monitoring, Analysis and Reporting Technology) gathered by the storage device controller 104.

Figure 3:
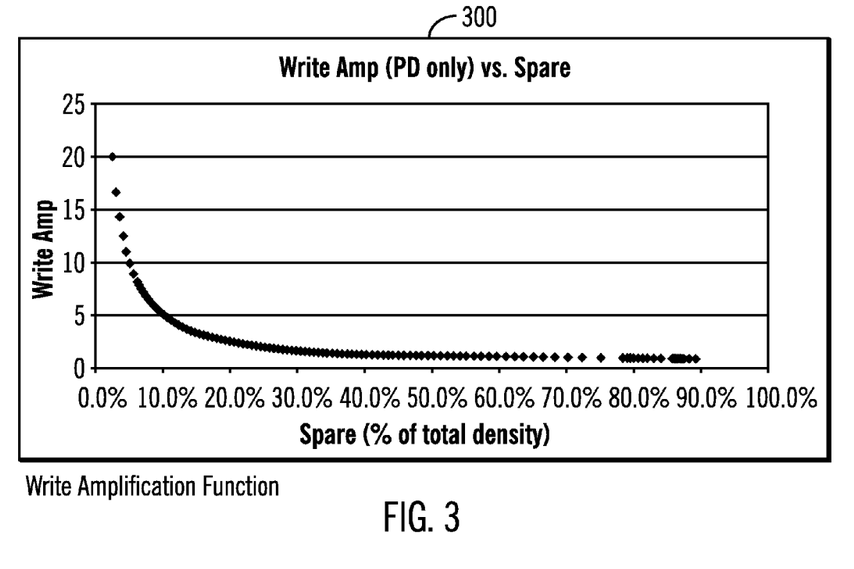
FIG. 3 illustrates an embodiment of a write amplification function modeling a percentage of spare space to over provision in a storage device as a function of write amplification.

FIG. 3 illustrates an embodiment of the write amplification function 300 showing the percentage of spare space of the total storage array 106 as a function of the write amplification values. The write amplification may be calculated as storage writes 206 divided by host writes 204. The write amplification function 300 may be created by the storage device 102 manufacturer based on testing that provides spare space percentages for different write amplifications that optimize performance by providing sufficient spare space to minimize the write amplification and wear leveling and maximize the available user space.

Figure 4:
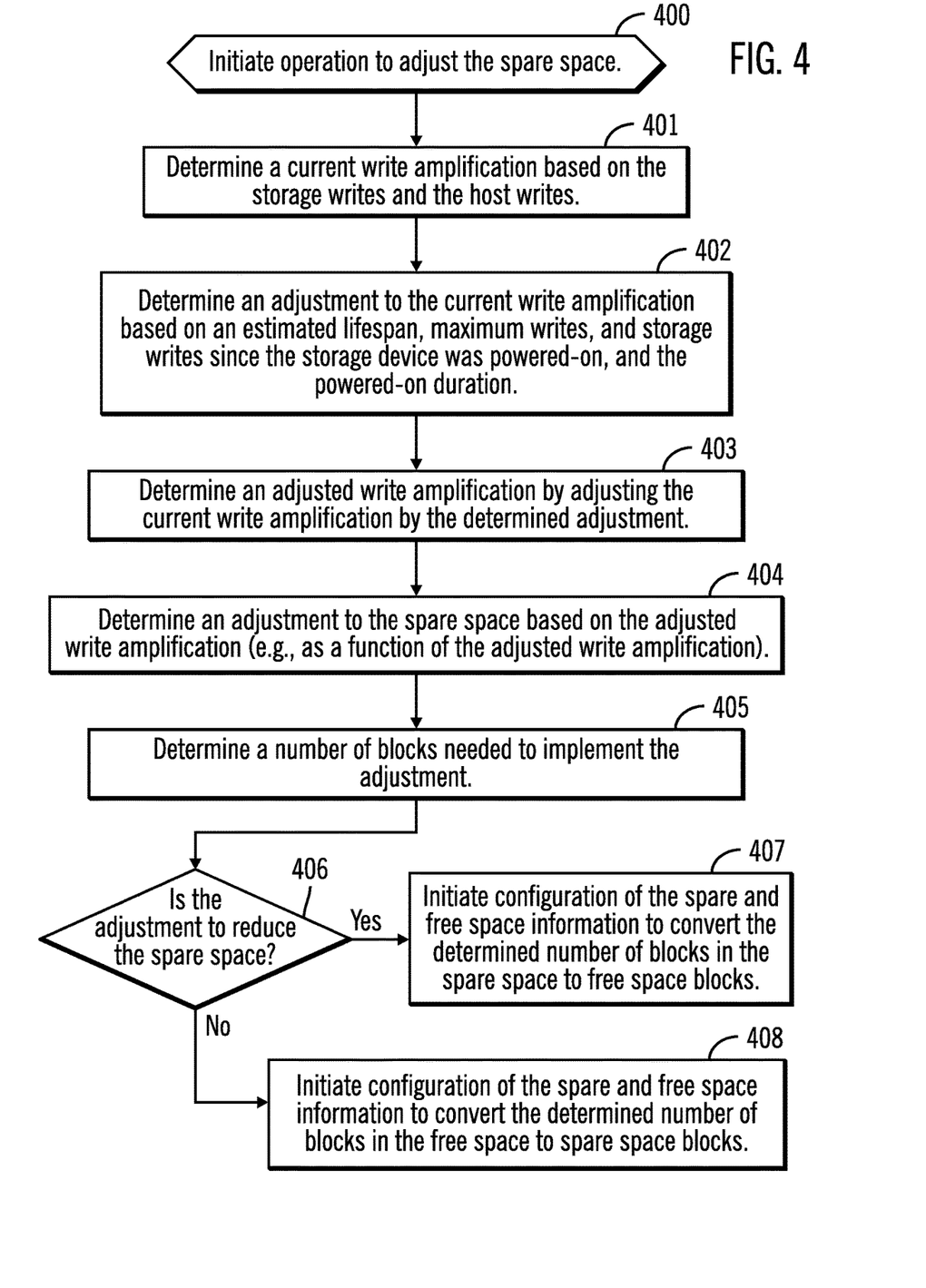
FIG. 4 illustrates an embodiment of operations to adjust the spare space unavailable to the user in the storage device.
Figure 5:
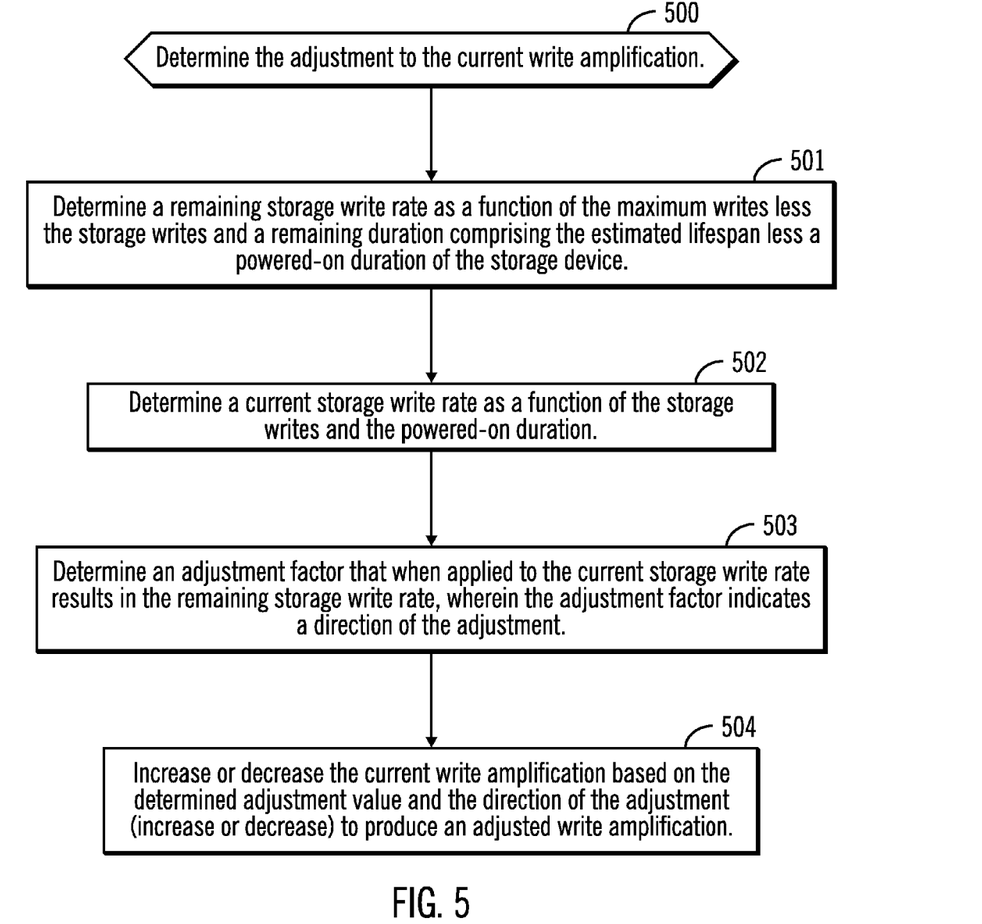
FIG. 5 illustrates an embodiment of operations to determine an adjustment to the write amplification used in determining an adjustment to the spare space.

FIG. 4 illustrates an embodiment of operations performed the spare space adjustment module 128 to adjust the spare space in the storage arrays 106. As mentioned, the spare space adjustment module 128 may be implemented in the host system storage device driver 116 and/or the storage device controller 104. Upon initiating (at block 400) an operation to adjust the spare space, the spare space adjustment module 128 determines (at block 401) a current write amplification based on the storage writes 206 and the host writes 204, such as dividing the storage writes 206 by the host writes 204. An adjustment to the current write amplification is determined (at block 402) based on the estimated lifespan 210, maximum writes 208, storage writes 206, and the powered-on duration 202, which information may be gathered from the storage device 100. The spare space adjustment module 128 determines (at block 403) an adjusted write amplification by adjusting the current write amplification by the determined adjustment. FIG. 5 provides further details on how the adjustment to the write amplification may be determined.

The spare space adjustment module 128 then determines (at block 404) an adjustment to the spare space based on the adjusted write amplification, such as by determining the spare space corresponding to the point on the write amplification function 300 for the adjusted write amplification. The spare space adjustment module 128 determines (at block 405) a number of blocks that are needed to implement the spare space adjustment, such as to increase or decrease the amount of spare space as a percentage of the total space in the storage array 106. An adjustment to increase the spare space would result in decreasing the free space available to the user and an adjustment to decrease the spare space would result in increasing the free space available to the user.

In certain embodiments, the write amplification function 300 is a function of the workload and not all workloads have the exact same write amplification function. To address this concern, in one alternative embodiment, the spare space adjustment module 128 may select the appropriate write application function to use from a set of write amplification functions that provides write amplification functions specific to a particular workload or workload range at the storage device 102. The manufacturer may include this set of write amplification functions in the storage device 102.

In a further alternative embodiment involving a proportional use of the write amplification curve, a single write amplification function 300 may be used by adjusting the write amplification according to the current workload. For example, if a determination is made to adjust the write amplification function 300 by a factor, e.g., double, then a determination is made of a current write amplification corresponding to the point on the write amplification curve for the current spare space amount. Then that current write amplification is adjusted by the factor of the determined adjusted write amplification to calculate an adjusted write amplification. The target spare space amount comprises the spare space amount corresponding to the point on the write amplification curve defined for the calculated adjusted write amplification. The spare space module 128 may then adjust the current spare space amount to the determined target spare space amount.

If (at block 406) the adjustment is to reduce the spare space, which occurs when the host write rate has been relatively low, then the spare space adjustment module 128 may configure (at block 407) the spare 122 and free 124 space information to convert the determined number of blocks in the spare space to free space blocks. The spare space adjustment module 128 may perform configuration operations by issuing commands to the controller 104. If (at block 406) the adjustment is to increase the spare space in order to reduce the number of storage writes for garbage collection, which occurs when the current host write rate is too high, then the spare space adjustment module 128 may initiate (at block 408) configuration of the spare 122 and free 124 space information to convert the determined number of blocks in the free space to spare space blocks. To convert spare space blocks to free space blocks, blocks in the spare space information 122 may be moved to the free space information 124.

With the operations of FIG. 4, if the storage write rate (wear level) to date is relatively low, then the write amplification may be increased, which may be accomplished by reducing the spare space to increase the amount of free space available to the user and increasing the storage write rate. If the storage write rate to date is relatively high, meaning a high wear level rate, then the write amplification needs to be reduced to reduce the storage write rate, which is accomplished by increasing the spare space.

FIG. 5 illustrates an embodiment of further operations performed by the spare space adjustment module 128 to determine the adjustment to the write amplification. Upon initiating (at block 500) the operation to determine the adjustment to make to the write amplification, such as performed in block 403 in FIG. 4, the spare space adjustment module 128 determines (at block 501) a remaining write rate as a function of the maximum storage writes 208 less the storage writes 206 and a remaining duration comprising the estimated lifespan 210 less a powered-on duration 202 of the storage device 100. Equation (1) below is one embodiment of the calculation of the remaining write rate:

$$(\text{maximum storage writes} - \text{storage writes})/(\text{estimated lifespan} - \text{powered-on duration}) \qquad (1)$$

The spare space adjustment module 128 further determines (at block 502) a current storage write rate as a function of the storage writes 206 and the powered-on duration 202. Equation (2) below is one embodiment of the calculation of the current storage write rate.

$$\text{storage writes/powered-on duration} \qquad (2)$$

A determination is then made (at block 503) of an adjustment factor that when applied to the current storage write rate results in the remaining storage write rate. The adjustment factor may indicate a direction of the adjustment. For instance, in one embodiment, if the current storage write rate is lower than the remaining storage write rate, then the adjustment factor may comprise the remaining storage write rate divided by the current storage write rate and indicate a positive direction to increase the write amplification by the adjustment factor. If the current storage write rate is greater than the remaining storage write rate, then the adjustment factor may comprise the remaining write rate divided by the current storage write rate and indicate a negative direction to decrease the write amplification by the adjustment factor.

The spare space adjustment module 128 then increases or decreases (at block 504) the current write amplification based on the determined adjustment value and the direction of the adjustment (increase or decrease) to produce an adjusted write amplification.

Figure 6:
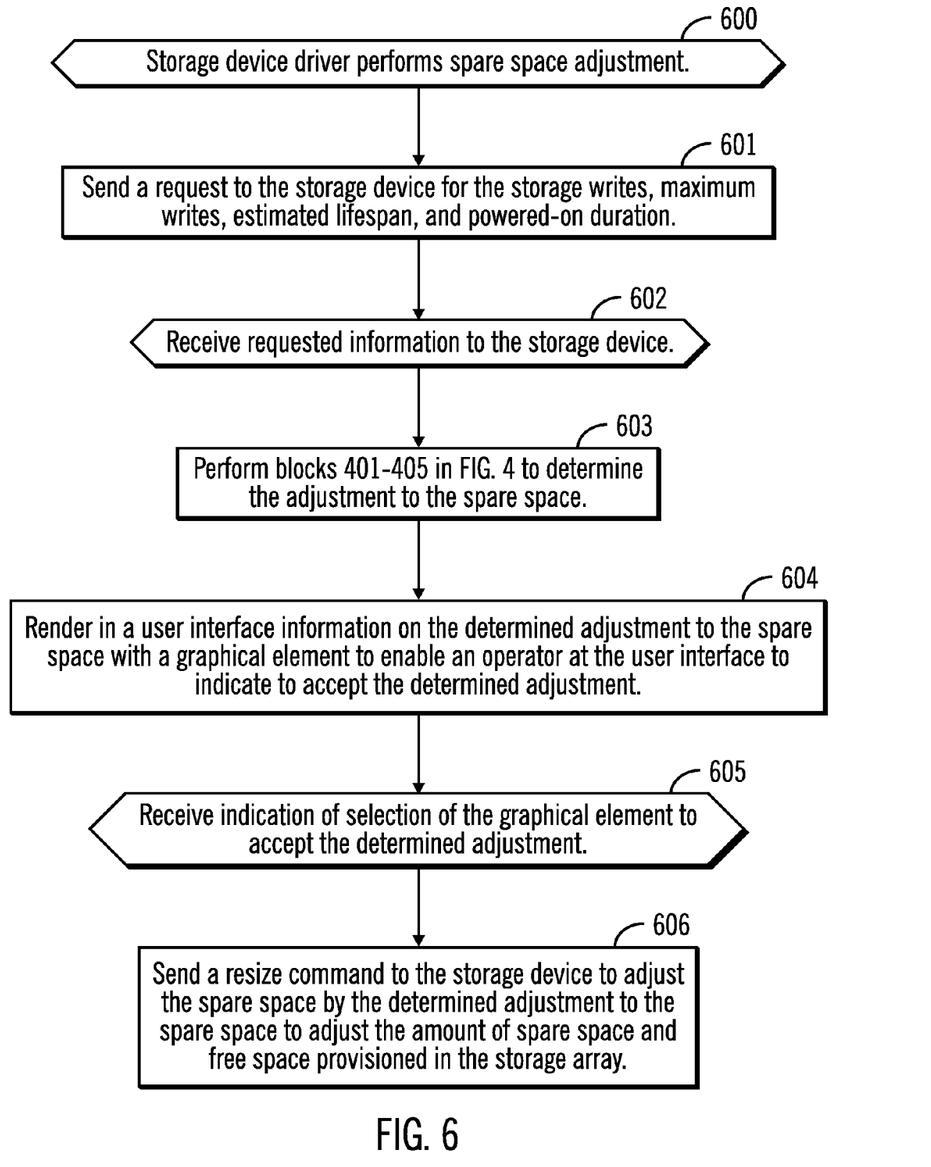
FIG. 6 illustrates an embodiment of operations performed by a storage device driver in a host system to adjust the spare space.

FIG. 6 illustrates one embodiment of operations when the spare space adjustment module 128 is implemented in the storage device driver 116. The storage device driver 116 may initiate spare space adjustment operations in response to user invocation or according to a periodic schedule or event, such as the used space in the storage device 102 reaching a critical level. In response to initiating (at block 600) spare space management operations, the storage device driver 116 sends (at block 601) a request to the storage device 102 for consumption profile information 200, including storage writes 206, maximum writes 208, estimated lifespan 210, and powered-on duration 202. Upon receiving (at block 602) the requested information, the storage device driver 116 performs the operations of blocks 401-405 and FIG. 5 to determine the adjustment to make to the spare space. The storage device driver 116 renders (at block 604) in a user interface 130, such as a graphical user interface (GUI), information on the determined adjustment to the spare space with a graphical element to enable an operator at the user interface to indicate to accept the determined adjustment.

Upon receiving (at block 605) indication from the user interface 130 of selection of the graphical element to accept the determined adjustment, the storage device driver 116 sends (at block 606) a resize command with an adjustment amount as a parameter for the spare space to the storage device 102. This resize command causes the storage device controller 104 to adjust the spare space by the determined adjustment to the spare space to cause the controller 104 to adjust the amount of spare space and free space provisioned in the storage array 106.

In an alternative embodiment, the storage device driver 116 may perform the spare space adjustment operations automatically without requiring prompting by the user through the user interface 130.

Figure 7:
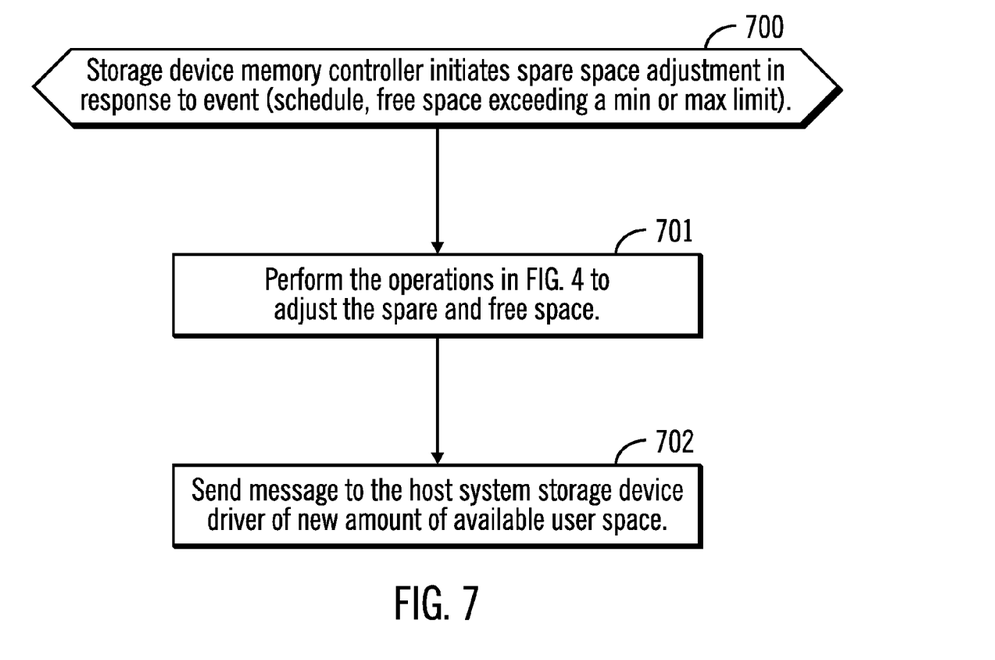
FIG. 7 illustrates an embodiment of operations performed by the storage device to adjust the spare space in the storage array of the storage device.

FIG. 7 illustrates an embodiment of operations when the spare space adjustment module 128 is implemented in the controller 106 of the storage device 102 as shown in FIG. 1. The spare space adjustment module 128 may initiate spare space adjustment operations in response to user invocation or according to a periodic schedule or event, such as the used space in the storage device 102 reaching a critical level. In response to initiating (at block 700) spare space management operations, the controller 106 performs the operations in FIGS. 4 and 5 to adjust the spare and free space, and implement the adjustment, such as by updating the spare blocks 122 and free blocks 124 information. The controller 104 may send (at block 702) a message to the storage device driver 116 of the new amount of available user space so that the host operating system 112 may incorporate that information into its management of the storage device 102.

In a further embodiment, the storage device driver 116 may query the storage device 102 for how much user capacity may be exposed. In response, the spare space adjustment module 128 implemented in the storage device 102 determines how much user space can be increased, and spare space reduced, if practicable, and report that to the storage device driver 116. The storage device driver 116 may then, in response to user approval or automatic determinations, send a resize command to cause the storage device controller 104 to reconfigure blocks in the spare space 122 to the free space 124. The resize command may cause the storage device controller 104 to perform the operations at blocks 405-408 in FIG. 4 to reconfigure the spare and free space.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

The described operations of the spare space adjustment module 128, storage device driver 116 and other operating components 112, 114, 118, etc., may be implemented as a method, apparatus or computer readable storage medium using standard programming and/or engineering techniques to produce software, firmware, hardware, or any combination thereof. The described operations may be implemented as code or logic maintained in a "computer readable storage medium", which may directly execute the functions or where a processor may read and execute the code from the computer storage readable medium. The computer readable storage medium includes at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), etc. The computer readable storage medium may further comprise digital logic implemented in a hardware device (e.g., an integrated circuit chip, a programmable logic device, a Programmable Gate Array (PGA), field-programmable gate array (FPGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmission signals, but includes tangible components, such as hardware elements. Those skilled in the art will recognize that many modifications may be made to this configuration without departing from the scope of the present invention, and that the article of manufacture may comprise suitable information bearing medium known in the art.

EXAMPLES

The following examples pertain to further embodiments.

Example 1 is a computer program product comprising a computer storage medium having program instructions that when executed manage spare space in a storage device by performing operations, the operations, comprising: determining a current write amplification based on storage writes to a media at the storage device and host writes from a host to the storage device; determining an adjustment to the current write amplification to produce an adjusted write amplification based on an estimated lifespan of the storage device, a maximum storage writes for the storage device, and the storage writes at the storage device since the storage device was powered-on; determining an adjustment to the spare space based on the adjusted write amplification, wherein the spare space comprises overprovisioned storage space not comprising user accessible storage; and initiating an operation to reconfigure the spare space and the free space available to the user to adjust the spare space by the determined adjustment to the spare space.

In Example 2, the subject matter of Example 1 can optionally include that the determining the adjustment to the write amplification comprises: determining a remaining storage write rate as a function of the maximum storage writes less the storage writes and a remaining duration comprising the estimated lifespan less a powered-on duration of the storage device; and determining a current storage write rate as a function of the storages writes and the powered-on duration, wherein the adjustment to the write amplification is determined from the remaining storage write rate and the current storage write rate.

In Example 3, the subject matter of Example 1 and 2 can optionally include that the determining the adjustment to the write amplification from the remaining storage write rate and the current storage write rate comprises determining an adjustment factor that when applied to the current storage write rate results in the remaining storage write rate.

In Example 4, the subject matter of Examples 1-3 can optionally include that the adjustment factor indicates an increase to the current storage write rate, the determined adjustment indicates an increase to the current write amplification, which results to a decrease in the spare space, and wherein when the adjustment factor indicates a decrease to the current write rate, the determined adjustment indicates a decrease to the current write amplification, which results to an increase in the spare space.

In Example 5, the subject matter of Example 1-4 can optionally include that the determined adjustment to the spare space results from a write amplification function of spare space to write amplification applied to the adjusted write amplification.

In Example 6, the subject matter of Examples 1-5 can optionally include that the operations further comprise: determining one of a plurality of write amplification functions provided for different workloads at the storage device based on a current workload at the storage device, wherein the determined write amplification function is applied to the adjusted write amplification.

In Example 7, the subject matter of Examples 2-6 can optionally include that the operations further comprise: applying the adjustment factor to the write amplification according to the write amplification function and a current spare space usage at the storage device to obtain an adjusted write amplification; and determining a target spare space corresponding according to the write amplification function and the adjusted write amplification.

In Example 8, the subject matter of Examples 2-7 can optionally include that the computer readable storage medium is implemented in a host system in communication with the storage device, wherein the program instructions are executed in the host system, wherein the operations further comprise: sending a request to the storage device for information on the storage writes at the storage device; receiving from the storage device the information on the storage writes, wherein the received information is used to determine the current write amplification, and wherein the initiating the operation to reconfigure the spare space comprises sending to the storage device a command to adjust the spare space by the determined adjustment to the spare space to adjust the amount of the spare space provisioned in the storage device.

In Example 9, the subject matter of Examples 2-8 can optionally include that the operations further comprise: rendering in a user interface information on the determined adjustment to the spare space with a graphical element to enable an operator at the user interface to indicate to accept the determined adjustment to the spare space; and receiving indication of selection of the graphical element to accept the determined adjustment to the spare space, wherein the command to adjust the spare space is sent to the storage device in response to receiving the indication of the selection of the graphical element to accept the determined adjustment.

In Example 10, the subject matter of Examples 2-9 can optionally include that the computer readable storage medium is implemented in a controller of the storage device, enclosed within the storage device, wherein the program instructions are executed in the controller.

In Example 11, the subject matter of Examples 2-10 can optionally include that a host system is in communication with the storage device, and wherein the operations further comprise: sending by the host system a resize command to the storage device having as a parameter the adjustment to the spare space; and processing, by the storage device, the resize command to reconfigure the spare space and the free space available to the user to adjust the spare space by the adjustment to the spare space in the parameter of the resize command.

In Example 12, the subject matter of Examples 2-11 can optionally include that the storage device comprises a solid state storage device having NAND memory cells, wherein the spare space is used to perform garbage collection to consolidate pages of active data in blocks in the NAND memory cells having unused pages into fewer blocks.

Example 13 is a storage device in communication with a host system, comprising: a storage array comprising a storage media; and a controller executing logic to perform operations, the operations comprising: determining a current write amplification based on storage writes to a media at the storage device and host writes from a host to the storage device; determining an adjustment to the current write amplification to produce an adjusted write amplification based on an estimated lifespan of the storage device, a maximum storage writes for the storage device, and the storage writes at the storage device since the storage device was powered-on; determining an adjustment to spare space based on the adjusted write amplification, wherein the spare space comprises overprovisioned storage space not comprising user accessible storage; and reconfiguring the spare space and the free space available to the user to adjust the spare space by the determined adjustment to the spare space.

In Example 14, the subject matter of Example 13 can optionally include that the determining the adjustment to the write amplification comprises: determining a remaining storage write rate as a function of the maximum storage writes less the storage writes and a remaining duration comprising the estimated lifespan less a powered-on duration of the storage device; and determining a current storage write rate as a function of the storages writes and the powered-on duration, wherein the adjustment to the write amplification is determined from the remaining storage write rate and the current storage write rate.

In Example 15, the subject matter of Examples 13 and 14 can optionally include that the determined adjustment to the spare space results from a write amplification function of spare space to write amplification applied to the adjusted write amplification.

In Example 16, the subject matter of Examples 13-15 can optionally include that the operations further comprise: reconfiguring the spare space and the free space available to the user to adjust the spare space by the determined adjustment to the spare space.

Example 17 is a system in communication with a storage device, comprising: a processor; and a computer readable storage medium having computer program code executed by the processor to perform operations, the operations comprising: determining a current write amplification based on storage writes to a media at the storage device and host writes from a host to the storage device; determining an adjustment to the current write amplification to produce an adjusted write amplification based on an estimated lifespan of the storage device, a maximum storage writes for the storage device, and the storage writes at the storage device since the storage device was powered-on; determining an adjustment to spare space based on the adjusted write amplification, wherein the spare space comprises overprovisioned storage space not comprising user accessible storage; and sending to the storage device a command to reconfiguring the spare space and the free space available to the user to adjust the spare space by the determined adjustment to the spare space.

In Example 18, the subject matter of Example 17 can optionally include that the operations further comprise: sending a request to the storage device for information on the storage writes at the storage device; and receiving from the storage device the information on the storage writes, wherein the received information is used to determine the current write amplification.

In Example 19, the subject matter of Examples 17 and 18 can optionally include that the operations further comprise: rendering in a user interface information on the determined adjustment to the spare space with a graphical element to enable an operator at the user interface to indicate to accept the determined adjustment to the spare space; and receiving indication of selection of the graphical element to accept the determined adjustment to the spare space, wherein the command to adjust the spare space is sent to the storage device in response to receiving the indication of the selection of the graphical element to accept the determined adjustment.

In Example 20, the subject matter of Examples 17-19 can optionally include that the sending the command comprises: sending a resize command to the storage device having as a parameter the adjustment to the spare space, wherein the resize command causes the storage device to reconfigure the spare space and the free space available to the user to adjust the spare space by the adjustment to the spare space in the parameter of the resize command.

Example 21 is an apparatus, comprising: means for determining a current write amplification based on storage writes to a media at a storage device and host writes from a host to the storage device; means for determining an adjustment to the current write amplification to produce an adjusted write amplification based on an estimated lifespan of the storage device, a maximum storage writes for the storage device, and the storage writes at the storage device since the storage device was powered-on; means for determining an adjustment to spare space based on the adjusted write amplification, wherein the spare space comprises overprovisioned storage space not comprising user accessible storage; and means for initiating an operation to reconfigure the spare space and the free space available to the user to adjust the spare space by the determined adjustment to the spare space.

In Example 22, the subject matter of Example 21 can optionally include that the means for determining the adjustment to the write amplification comprises: means for determining a remaining storage write rate as a function of the maximum storage writes less the storage writes and a remaining duration comprising the estimated lifespan less a powered-on duration of the storage device; and means for determining a current storage write rate as a function of the storages writes and the powered-on duration, wherein the adjustment to the write amplification is determined from the remaining storage write rate and the current storage write rate.

In Example 23, the subject matter of Examples 21 and 22 can optionally include that the means for determining the adjustment to the write amplification from the remaining storage write rate and the current storage write rate comprises determining an adjustment factor that when applied to the current storage write rate results in the remaining storage write rate.

Example 24 is a method, comprising: determining a current write amplification based on storage writes to a media at a storage device and host writes from a host to the storage device; determining an adjustment to the current write amplification to produce an adjusted write amplification based on an estimated lifespan of the storage device, a maximum storage writes for the storage device, and the storage writes at the storage device since the storage device was powered-on; determining an adjustment to the spare space based on the adjusted write amplification, wherein the spare space comprises overprovisioned storage space not comprising user accessible storage; and initiating an operation to reconfigure the spare space and the free space available to the user to adjust the spare space by the determined adjustment to the spare space.

In Example 25, the subject matter of Example 24 can optionally include that the determining the adjustment to the write amplification comprises: determining a remaining storage write rate as a function of the maximum storage writes less the storage writes and a remaining duration comprising the estimated lifespan less a powered-on duration of the storage device; and determining a current storage write rate as a function of the storages writes and the powered-on duration, wherein the adjustment to the write amplification is determined from the remaining storage write rate and the current storage write rate.

In Example 26, the subject matter of Examples 24 and 25 can optionally include that the determining the adjustment to the write amplification from the remaining storage write rate and the current storage write rate comprises determining an adjustment factor that when applied to the current storage write rate results in the remaining storage write rate.

In Example 27, the subject matter of Examples 24-26 can optionally include that the adjustment factor indicates an increase to the current storage write rate, the determined adjustment indicates an increase to the current write amplification, which results to a decrease in the spare space, and wherein when the adjustment factor indicates a decrease to the current write rate, the determined adjustment indicates a decrease to the current write amplification, which results to an increase in the spare space.

In Example 28, the subject matter of Examples 24-27 can optionally include that the determined adjustment to the spare space results from a write amplification function of spare space to write amplification applied to the adjusted write amplification.

In Example 29, the subject matter of Examples 24-28 can optionally include that determining one of a plurality of write amplification functions provided for different workloads at the storage device based on a current workload at the storage device, wherein the determined write amplification function is applied to the adjusted write amplification.

In Example 30, the subject matter of Examples 24-29 can optionally include applying the adjustment factor to the write amplification according to the write amplification function and a current spare space usage at the storage device to obtain an adjusted write amplification; and determining a target spare space corresponding according to the write amplification function and the adjusted write amplification.

In Example 31, the subject matter of Examples 24-30 can optionally include that the method is performed in a host system in communication with the storage device, wherein the host system further performs: sending a request to the storage device for information on the storage writes at the storage device; receiving from the storage device the information on the storage writes, wherein the received information is used to determine the current write amplification, and wherein the initiating the operation to reconfigure the spare space comprises sending to the storage device a command to adjust the spare space by the determined adjustment to the spare space to adjust the amount of the spare space provisioned in the storage device.

In Example 32, the subject matter of Examples 24-31 can optionally include rendering in a user interface information on the determined adjustment to the spare space with a graphical element to enable an operator at the user interface to indicate to accept the determined adjustment to the spare space; and receiving indication of selection of the graphical element to accept the determined adjustment to the spare space, wherein the command to adjust the spare space is sent to the storage device in response to receiving the indication of the selection of the graphical element to accept the determined adjustment.

In Example 33, the subject matter of Examples 24-32 can optionally include that the method is implemented in a controller of the storage device, enclosed within the storage device.

In Example 34, the subject matter of Examples 24-33 can optionally include that a host system is in communication with the storage device, further comprising: sending by the host system a resize command to the storage device having as a parameter the adjustment to the spare space; and processing, by the storage device, the resize command to reconfigure the spare space and the free space available to the user to adjust the spare space by the adjustment to the spare space in the parameter of the resize command.

In Example 35, the subject matter of Examples 24-34 can optionally include that the storage device comprises a solid state storage device having NAND memory cells, wherein the spare space is used to perform garbage collection to consolidate pages of active data in blocks in the NAND memory cells having unused pages into fewer blocks.

Example 36 is a machine readable medium including code, when executed, to cause a machine to perform the method of any one of claims 24-35.

In Example 37, subject matter of Example 24 can optionally include at least one step of:

(1) wherein the determining the adjustment to the write amplification comprises: determining a remaining storage write rate as a function of the maximum storage writes less the storage writes and a remaining duration comprising the estimated lifespan less a powered-on duration of the storage device; and determining a current storage write rate as a function of the storages writes and the powered-on duration, wherein the adjustment to the write amplification is determined from the remaining storage write rate and the current storage write rate; and/or (2) wherein the determining the adjustment to the write amplification from the remaining storage write rate and the current storage write rate comprises determining an adjustment factor that when applied to the current storage write rate results in the remaining storage write rate; and/or (3) wherein when the adjustment factor indicates an increase to the current storage write rate, the determined adjustment indicates an increase to the current write amplification, which results to a decrease in the spare space, and wherein when the adjustment factor indicates a decrease to the current write rate, the determined adjustment indicates a decrease to the current write amplification, which results to an increase in the spare space; and/or (4) wherein the determined adjustment to the spare space results from a write amplification function of spare space to write amplification applied to the adjusted write amplification; and/or (5) determining one of a plurality of write amplification functions provided for different workloads at the storage device based on a current workload at the storage device, wherein the determined write amplification function is applied to the adjusted write amplification; and/or (6) applying the adjustment factor to the write amplification according to the write amplification function and a current spare space usage at the storage device to obtain an adjusted write amplification; and determining a target spare space corresponding according to the write amplification function and the adjusted write amplification; and/or (7) wherein the method is performed in a host system in communication with the storage device, wherein the method in the host system further performs: sending a request to the storage device for information on the storage writes at the storage device; receiving from the storage device the information on the storage writes, wherein the received information is used to determine the current write amplification, and wherein the initiating the operation to reconfigure the spare space comprises sending to the storage device a command to adjust the spare space by the determined adjustment to the spare space to adjust the amount of the spare space provisioned in the storage device; and/or (8) rendering in a user interface information on the determined adjustment to the spare space with a graphical element to enable an operator at the user interface to indicate to accept the determined adjustment to the spare space; and receiving indication of selection of the graphical element to accept the determined adjustment to the spare space, wherein the command to adjust the spare space is sent to the storage device in response to receiving the indication of the selection of the graphical element to accept the determined adjustment; and/or (9) wherein the method is implemented in a controller of the storage device, enclosed within the storage device; and/or (10) wherein a host system is in communication with the storage device, and further comprising: sending by the host system a resize command to the storage device having as a parameter the adjustment to the spare space; and processing, by the storage device, the resize command to reconfigure the spare space and the free space available to the user to adjust the spare space by the adjustment to the spare space in the parameter of the resize command; and/or (11) wherein the storage device comprises a solid state storage device having NAND memory cells, wherein the spare space is used to perform garbage collection to consolidate pages of active data in blocks in the NAND memory cells having unused pages into fewer blocks.

Example 38 is an apparatus comprising means to perform a method in any preceding Example 24-37.

Example 39 is a machine-readable storage including machine-readable instructions, when executed, to implement a method or realize an apparatus or system in any preceding Example 24-37.

What is claimed:

1. An apparatus to manage spare space unavailable to a user and available to consolidate pages for garbage collection operations in a storage device to:
determine an adjustment factor to a current storage write rate to result in a remaining storage write rate of remaining writes permitted at the storage device to reach an estimated lifespan of the storage device;
determine an adjustment to the spare space based on the adjustment factor; and
reconfigure the spare space and free space available to a user to adjust the spare space by the adjustment to the spare space to perform one of convert blocks in the spare space to free space blocks and convert a number of blocks in the free space to spare space blocks.

2. The apparatus of claim 1, further to:
maintain a write amplification function providing spare space percentages for different write amplifications to optimize performance at the storage device;
determine the remaining storage write rate of remaining writes permitted at the storage device;
determine an adjusted write amplification by applying the adjustment factor to a current write amplification; and
determine from the write amplification function the adjustment to spare space for the adjusted write amplification, wherein the spare space comprises overprovisioned storage space not comprising user accessible storage.

3. The apparatus of claim 2, wherein the remaining storage write rate is determined as a function of maximum storage writes less storage writes and a remaining duration comprising an estimated lifespan less a powered-on duration of the storage device, and wherein the current storage write rate is determined as a function of the storage writes and the powered-on duration.

4. The apparatus of claim 2, wherein when the adjustment factor indicates an increase to the current storage write rate, the adjustment to spare space indicates an increase to the current write amplification, which results in a decrease in the spare space, and wherein when the adjustment factor indicates a decrease to the current storage write rate, the adjustment to spare space indicates a decrease to the current write amplification, which results in an increase in the spare space.

5. The apparatus of claim 2, further to:
maintain a plurality of write amplification functions for different workloads at the storage device; and
determine one of the plurality of the write amplification functions based on a current workload at the storage device to determine the adjustment to the spare space.

6. The apparatus of claim 2, wherein the apparatus is implemented in a controller of the storage device, enclosed within the storage device, wherein program instructions to perform operations of the apparatus are executed in the controller.

7. The apparatus of claim 2, wherein the storage device comprises a solid state storage device having NAND memory cells, wherein the spare space is used to perform garbage collection to consolidate pages of active data in blocks in the NAND memory cells having unused pages into fewer blocks.

8. A system in communication with a storage device to manage spare space unavailable to a user and available to consolidate pages for garbage collection operations in the storage device comprising:
a processor to execute computer instructions in a memory device to:
determine an adjustment factor to a current storage write rate to result in a remaining storage write rate of remaining writes permitted at the storage device to reach an estimated lifespan of the storage device;
determine an adjustment to the spare space based on the adjustment factor; and
reconfigure the spare space and free space available to a user to adjust the spare space by the adjustment to the spare space to perform one of convert blocks in the spare space to free space blocks and convert a number of blocks in the free space to spare space blocks.

9. The system of claim 8, wherein the processor is further to:
maintain a write amplification function providing spare space percentages for different write amplifications to optimize performance at the storage device;
determine the remaining storage write rate of remaining writes permitted at the storage device;
determine an adjusted write amplification by applying the adjustment factor to a current write amplification; and
determine from the write amplification function the adjustment to spare space for the adjusted write amplification, wherein the spare space comprises overprovisioned storage space not comprising user accessible storage; and
send a resize command to the storage device having as a parameter the adjustment to the spare space for the adjusted write amplification to cause the storage device to reconfigure the spare space and free space available to a user by the adjustment to the spare space in the parameter of the resize command.

10. The system of claim 9, wherein the remaining storage write rate is determined as a function of maximum storage writes less storage writes and a remaining duration comprising an estimated lifespan less a powered-on duration of the storage device, and wherein the current storage write rate is determined as a function of the storage writes and the powered-on duration.

11. The system of claim 9, wherein when the adjustment factor indicates an increase to the current storage write rate, the adjustment to spare space indicates an increase to the current write amplification, which results in a decrease in the spare space, and wherein when the adjustment factor indicates a decrease to the current storage write rate, the adjustment to spare space indicates a decrease to the current write amplification, which results in an increase in the spare space.

12. The system of claim 9, wherein the processor is further to:
maintain a plurality of write amplification functions for different workloads at the storage device; and
determine one of the plurality of the write amplification functions based on a current workload at the storage device to determine the adjustment to the spare space.

13. The system of claim 9, wherein the storage device comprises a solid state storage device having NAND memory cells, wherein the spare space is used to perform garbage collection to consolidate pages of active data in blocks in the NAND memory cells having unused pages into fewer blocks.

14. The system of claim 9, wherein the processor is further to:
send a request to the storage device for information on storage writes at the storage device; and
receive from the storage device the information on the storage writes, wherein the information is used to determine the current write amplification.

15. The system of claim 14, wherein the processor is further to:
render in a user interface information on the adjustment to spare space with a graphical element to enable an operator at the user interface to indicate to accept the adjustment to spare space; and
receive indication of selection of the graphical element to accept the adjustment to spare space, wherein the resize command to adjust the spare space is sent to the storage device in response to receiving the indication of the selection of the graphical element to accept the adjustment to spare space.

16. A system to manage spare space unavailable to a user and available to consolidate pages for garbage collection operations in a storage device, comprising:
a host including a processor and memory having computer instructions executed by the processor; and
a storage device,
a spare space adjustment module implemented in one of the host and the storage device to:
determine an adjustment factor to a current storage write rate to result in a remaining storage write rate of remaining writes permitted at the storage device to reach an estimated lifespan of the storage device;
determine an adjustment to the spare space based on the adjustment factor; and
reconfigure the spare space and free space available to a user to adjust the spare space by the adjustment to the spare space to perform one of convert blocks in the spare space to free space blocks and convert a number of blocks in the free space to spare space blocks.

17. The system of claim 16, wherein the spare space adjustment module is further to:
maintain a write amplification function providing spare space percentages for different write amplifications to optimize performance at the storage device;
determine the remaining storage write rate of remaining writes permitted at the storage device;
determine an adjusted write amplification by applying the adjustment factor to a current write amplification; and
determine from the write amplification function the adjustment to spare space for the adjusted write amplification, wherein the spare space comprises overprovisioned storage space not comprising user accessible storage.

18. The system of claim 17, wherein the remaining storage write rate is determined as a function of maximum storage writes less storage writes and a remaining duration comprising an estimated lifespan less a powered-on duration of the storage device, and wherein the current storage write rate is determined as a function of the storage writes and the powered-on duration.

19. The system of claim 17, wherein when the adjustment factor indicates an increase to the current storage write rate, the adjustment to spare space indicates an increase to the current write amplification, which results in a decrease in the spare space, and wherein when the adjustment factor indicates a decrease to the current storage write rate, the adjustment to spare space indicates a decrease to the current write amplification, which results in an increase in the spare space.

20. The system of claim 17, wherein the spare space adjustment module is further to:
maintain a plurality of write amplification functions for different workloads at the storage device; and
determine one of the plurality of the write amplification functions based on a current workload at the storage device to determine the adjustment to the spare space.

21. The system of claim 17, wherein the storage device comprises a solid state storage device having NAND memory cells, wherein the spare space is used to perform garbage collection to consolidate pages of active data in blocks in the NAND memory cells having unused pages into fewer blocks.

22. The system of claim 17, wherein the spare space adjustment module is implemented in the host and is further to:
   send a request to the storage device for information on storage writes at the storage device; and
   receive from the storage device the information on the storage writes, wherein the information is used to determine the current write amplification.

23. The system of claim 22, wherein the spare space adjustment module in the host is further to:
   render in a user interface information on the adjustment to spare space with a graphical element to enable an operator at the user interface to indicate to accept the adjustment to spare space;
   receive indication of selection of the graphical element to accept the adjustment to spare space; and
   send a command to adjust the spare space to the storage device in response to receiving the indication of the selection of the graphical element to accept the adjustment to spare space.

24. The system of claim 17, wherein the host is further to:
   send a resize command to the storage device having as a parameter the adjustment to the spare space for the adjusted write amplification to cause the storage device to reconfigure the spare space and free space available to a user by the adjustment to the spare space in the parameter of the resize command.

25. A method for managing spare space unavailable to a user and available to consolidate pages for garbage collection operations in a storage device, comprising:
   determining an adjustment factor to a current storage write rate to result in a remaining storage write rate of remaining writes permitted at the storage device to reach an estimated lifespan of the storage device;
   determining an adjustment to the spare space based on the adjustment factor; and
   reconfiguring the spare space and free space available to a user to adjust the spare space by the adjustment to the spare space to perform one of convert blocks in the spare space to free space blocks and convert a number of blocks in the free space to spare space blocks.

26. The method of claim 25, further comprising:
   maintaining a write amplification function providing spare space percentages for different write amplifications to optimize performance at a storage device;
   determining the remaining storage write rate of remaining writes permitted at the storage device;
   determining an adjusted write amplification by applying the adjustment factor to a current write amplification; and
   determining from the write amplification function the adjustment to spare space for the adjusted write amplification, wherein the spare space comprises overprovisioned storage space not comprising user accessible storage.

27. The method of claim 26, wherein the determining the remaining storage write rate is determined as a function of maximum storage writes less storage writes and a remaining duration comprising an estimated lifespan less a powered-on duration of the storage device, and wherein the current storage write rate is determined as a function of the storage writes and the powered-on duration.

28. The method of claim 26, wherein when the adjustment factor indicates an increase to the current storage write rate, the adjustment to spare space indicates an increase to the current write amplification, which results in a decrease in the spare space, and wherein when the adjustment factor indicates a decrease to the current storage write rate, the adjustment to spare space indicates a decrease to the current write amplification, which results in an increase in the spare space.

29. The method of claim 26, further comprising:
   maintaining a plurality of write amplification functions for different workloads at the storage device; and
   determining one of the plurality of the write amplification functions based on a current workload at the storage device to determine the adjustment to the spare space.

* * * * *